United States Patent [19]
Hackl et al.

[11] Patent Number: 5,893,429
[45] Date of Patent: Apr. 13, 1999

[54] STEERING SYSTEM FOR A MOTOR VEHICLE

[75] Inventors: Matthias Hackl, Vaihingen; Werner Dilger, Buehl; Wolfgang Kraemer, Stuttgart, all of Germany

[73] Assignee: Robert Bosch GmbH, Stuttgart, Germany

[21] Appl. No.: 08/777,978

[22] Filed: Dec. 24, 1996

[30] Foreign Application Priority Data

Jan. 19, 1996 [DE] Germany ................ 196 01 827

[51] Int. Cl.$^6$ ................................................ B62D 5/04
[52] U.S. Cl. ...................... 180/443; 180/417; 70/253
[58] Field of Search ........................ 180/443, 444, 180/445, 446, 417, 421, 422, 404; 70/209, 237, 252, 253; 701/42, 44

[56] References Cited

U.S. PATENT DOCUMENTS 5,205,371   4/1993   Karnopp ........................ 180/79.1
5,299,648   4/1994   Watanabe et al. ............... 180/443

FOREIGN PATENT DOCUMENTS 42 43 267 A1   6/1994   Germany.

*Primary Examiner*—Kevin Hurley
*Attorney, Agent, or Firm*—Baker & Daniels

[57] ABSTRACT

A power steering system for a motor vehicle, comprising a steering wheel actuated by the driver of the vehicle, at least one steered wheel, an actuator motor that is activated to assist the steering movement initiated by the driver and a locking device for locking the steering wheel in at least one predetermined position. The steering wheel is moved to the predetermined position by activation of the actuator motor upon detection of a predetermined preset operating condition. Using the actuator motor to move the steering wheel to the predetermined position frees the driver from having to manually turn the steering wheel to the locking position upon shutdown of the vehicle. This has the advantage of increasing the comfort of such a steering system since the driver is freed from having to turn the steering wheel after shutdown of the vehicle and of increasing protection against theft since the driver does not have to remember to engage the steering lock upon shutdown of the vehicle.

14 Claims, 4 Drawing Sheets

STEERING SYSTEM FOR A MOTOR VEHICLE

BACKGROUND OF THE INVENTION

1. Field of the Invention

The invention relates to a steering system for a motor vehicle.

2. Related Art

Motor vehicle steering systems can be produced in large series as power steering systems. They comprise a steering wheel actuated by the driver of the vehicle, at least one steered wheel and an actuator for boosting the steering movement initiated by the driver. Additionally such steering systems may include a steering lock which locks the steering wheel in order to avoid or impede theft of the vehicle. The steering lock engages only in specific steering wheel positions. Hence, the driver must turn the steering wheel to this locking position in order to engage the steering lock when shutting the vehicle down.

Known, moreover, are steering systems, for instance from DE-OS 40 31 316 (corresponding to U.S. Pat. No. 5,205,371) or DE-OS 42 43 267, where a movement of an actuator, generally an electric motor, is superimposed by means of an actuator on the turning movements of the steering wheel actuated by the driver. The steered wheels are then activated depending on the overall movement thus obtained.

The objective of the present invention is to improve the safety and comfort of a power steering system as regards protection from theft.

SUMMARY OF THE INVENTION

As mentioned above, the invention is based on a steering system for a motor vehicle; comprising a steering wheel actuated by the driver of the vehicle, at least one steered wheel, an actuator motor that is activated for assisting the steering movement initiated by the driver and a locking device to lock the steering wheel in at least one specific steering wheel position.

The core of the invention is that the steering wheel is at a specific preset operating condition moved to the predetermined position by activation of the actuator motor. As a result, the driver is, in shutting the vehicle down, not required to manually turn the steering wheel to the locking position. This has the advantage that, for one, the comfort of such a steering system is increased, since the driver is freed from turning the steering wheel after vehicle shutdown and, for another, that the protection against theft is appreciably increased, since the driver can in accordance with the invention not forget to engage the steering wheel lock in shutting the vehicle down. Moreover, the invention has the advantage that the inventional function can be provided without additional expense in terms of sensors, actuators, etc. The locking device is able to lock the steering wheel mechanically.

The invention allows especially favorable use when the steering system features an actuator where the steering movement initiated by means of the steering wheel and the movement initiated by the actuator motor are for generation of the steering movement of the steered wheel superimposed by the actuator. To initiate its movement, the actuator is activated by a manipulated variable. In conventional power steering systems of electrohydraulic or electric type a boosting of the driver's steering force is effected, but an overlaying of the steering movements of the driver and of the actuator motor occurs in such overlay steering systems. Activation of the actuator motor, while the steering wheel is released, causes in such overlay steering systems mainly a turning of the steering wheel at near standstill of the actuator input, respectively of the wheels. This is the case particularly whenever the wheel reset moments at vehicle standstill are large, which generally is given with normal road surface conditions. By activation of the actuator motor, the steering wheel can thus be moved to a predetermined position as: the driver releases it. The released steering wheel lock engages then in said known position. In the case of a conventional power steering system as described above, the inventional activation of the actuator motor generally causes a concomitant steering of the steered wheels.

To recognize the occurrence of the specific preset operating condition at which the inventional activation of the actuator sets in there are means provided to which signals are fed that represent the operating condition of the vehicle engine, the state of closure of the vehicle doors, the position of the vehicle lock and/or the operating condition of a take-off or anti-theft lock. These measures provide several options, individually or in combination, to safely recognize the shutdown of the vehicle. One provision, in particular, is that the occurrence of the predetermined preset operating conditions is recognized with an internal combustion engine of the vehicle when there are no longer any ignition and/or injection signals detected or formed, respectively, when the driver door is opened and/or closed again, the vehicle lock is in the position in which the key is removed and/or a take-off or anti-theft lock is activated. Hence, the start of the inventional steering wheel turning occurs when it is found that the vehicle is shut down, e.g., when the ignition of the vehicle engine is turned off and/or the fuel metering of the vehicle engine is turned off and/or one or several vehicle doors, notably the driver door, are opened or closed again, and/or when the ignition key is removed. The inventional turning of the steering wheel to engagement position can be triggered also by a take-off, anti-theft lock.

A favorable embodiment of the invention provides for moving the steering wheel upon occurrence of a further predetermined preset operating condition to a further predetermined position by activation of the actuator. Envisaged here is that the further predetermined position is the position of the steering wheel in which it was contained prior to the occurrence of the first predetermined preset operating condition. This embodiment accomplishes that, when the steering wheel lock is disengaged prior to a new travel start, the steering wheel is by suitable activation of the actuator motor reset to a starting position, thereby reestablishing the relationship between steering wheel angle and steering angle of the wheels that is desired for the travel operation.

To recognize the occurrence of the further predetermined preset operating condition, i.e., to recognize a new travel start, means are provided to which signals are again fed that represent the operating condition of the vehicle engine, the state of closure of the vehicle doors, the position of a vehicle lock and/or the operating condition of a take-off, or anti-theft lock. Specifically, a new travel start of the vehicle can be recognized by detection of ignition and/or injection signals, opening and closing of the driver door, by the position of the vehicle lock that represents an inserted key and/or by activation of a take-off, or anti-theft lock. The above options for recognition of the new travel start can be queried individually or in combination.

Figure 4:
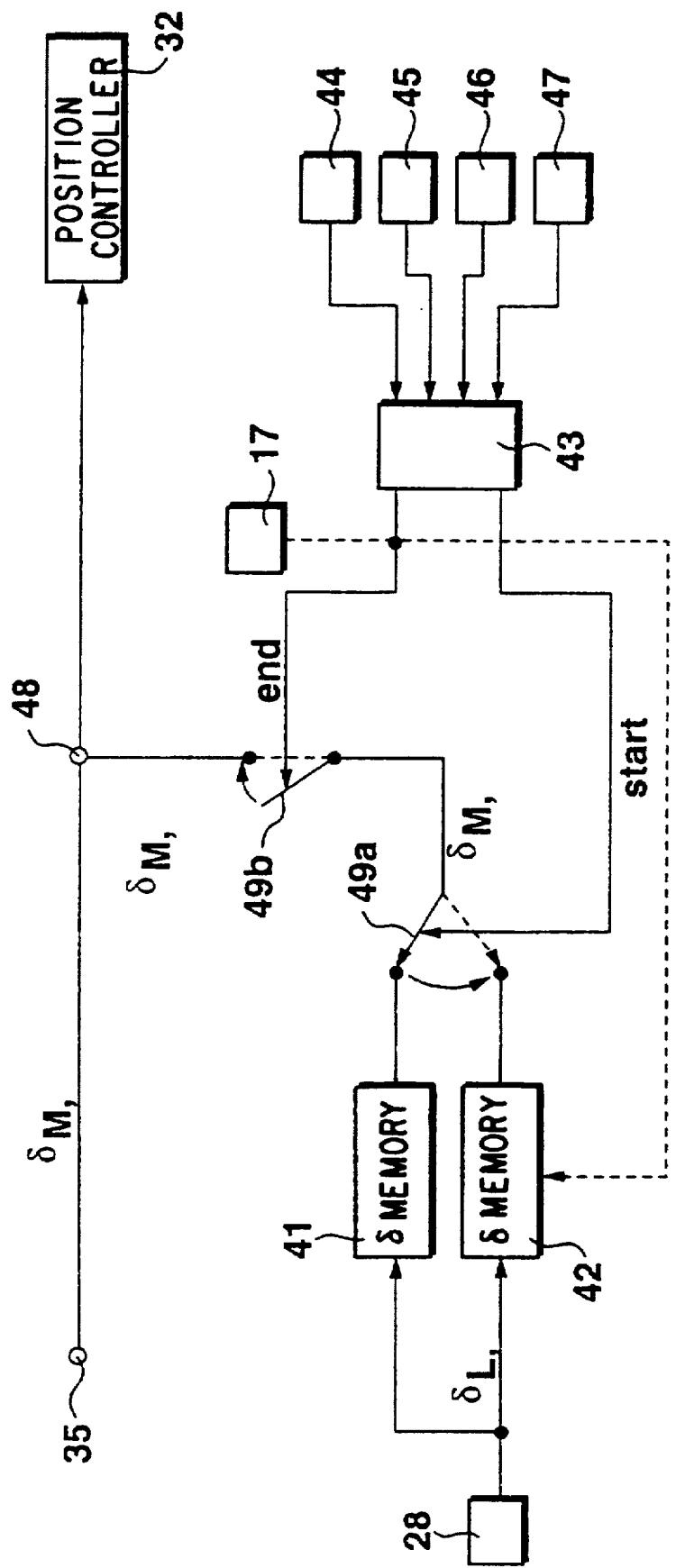

3 regulating strategy of such a steering system, while FIG. 4 illustrates the inventional activation.

DETAILED DESCRIPTION OF THE PREFERRED EMBODIMENT

The invention is illustrated hereafter with the aid of an exemplary embodiment, based in exemplary fashion on the above mentioned overlay steering system.

Figure 1:
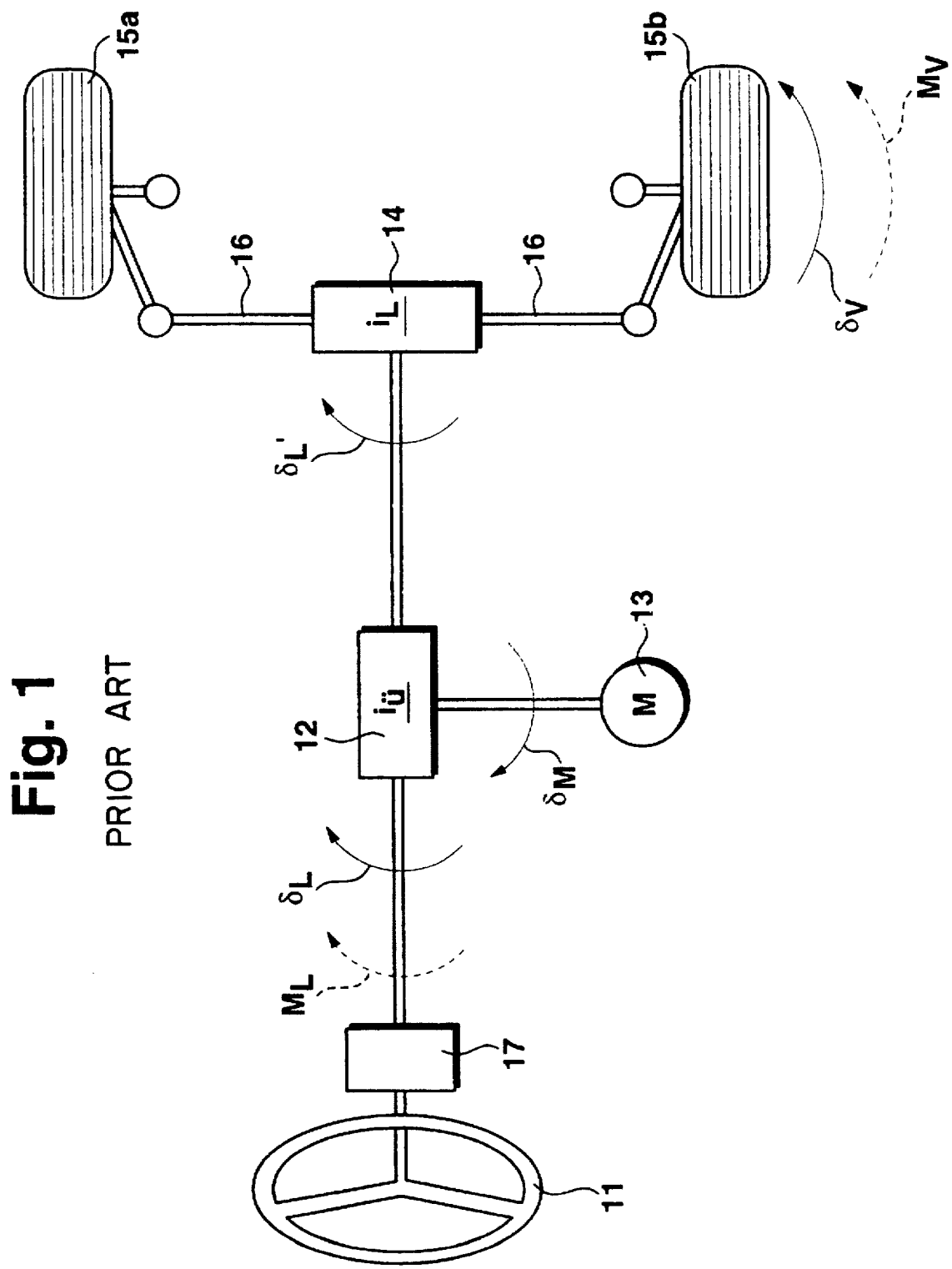
FIGS. 1 and 2 show schematically a steering system according to the prior art.
Figure 2:
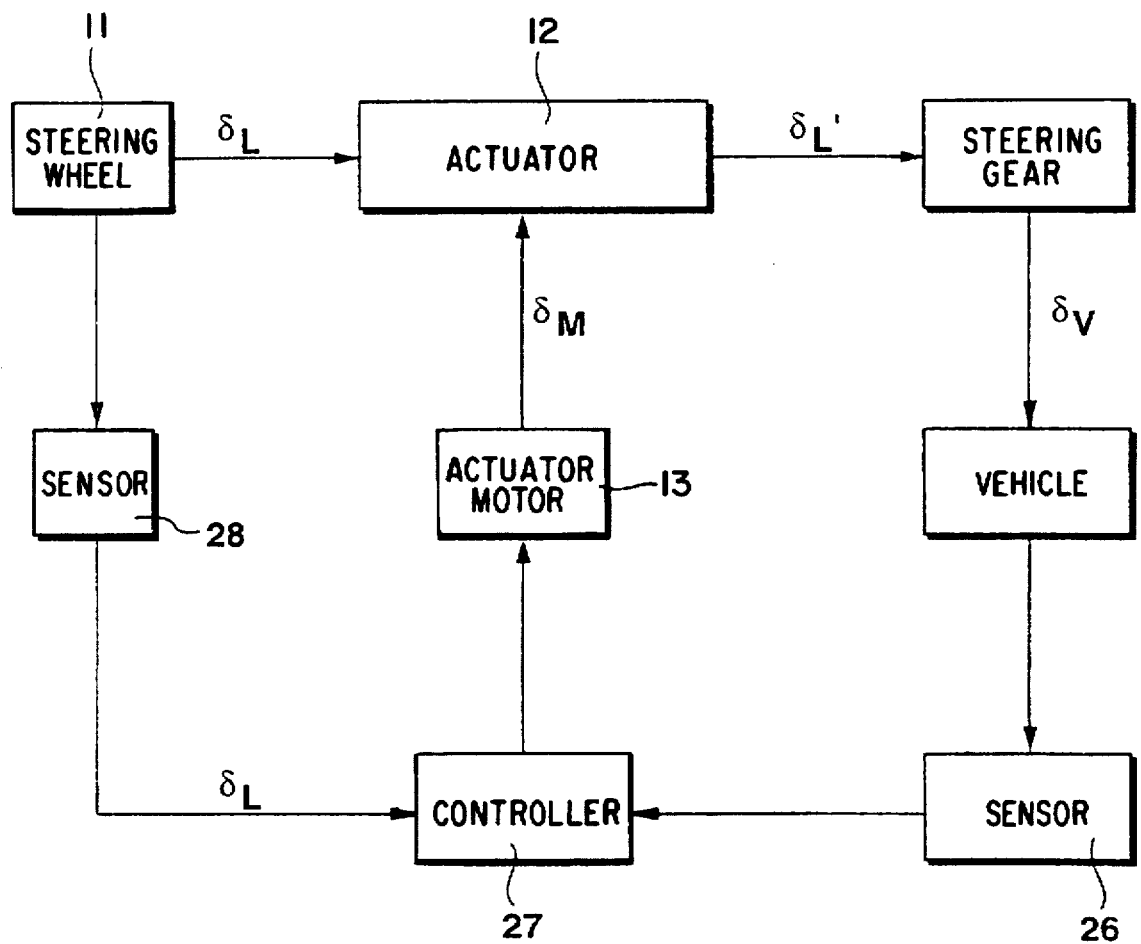

Referenced 11 and 21 in FIGS. 1 and 2, respectively, is a steering wheel actuated by the driver of the vehicle. Actuation of the steering wheel 11, or 21, transmits to the actuator 12 or 22 the steering wheel angle $\delta_L$, or the steering wheel moment $M_L$, respectively. At the same time, the motor angle $\delta_M$ of the actuator motor 13 or 23 is passed to the actuator motor 12 or 22, respectively, wherein the actuator may be designed as an electric motor. On the output end of the actuator 12 or 22, the overall movement $\delta_L'$ is transmitted to the steering gear 14, or 24, respectively, the steering gear, in turn, acts via the steering linkage 16 in accordance with the overall angle $\delta_L'$ on the wheels 15a and 15b with the steering angle $\delta_V$. FIG. 2 also depicts sensors 28 and 26, the sensor 28 detecting the steering wheel angle $\delta_L$ and transmitting it to the controller 27, and the reference 26 signifying sensors which detect the movements of the vehicle 25 (for instance yaw movements, transverse acceleration, vehicle speed etc.) and transmitting them to the controller 27. Depending on the detected steering wheel angle $\delta_L$ and, as the case may be, depending on the vehicle movements, the controller 27 determines a manipulated variable u for activation of the actuator motor 13 or 23. Referenced 17 in FIG. 1, on the steering column, is a locking device. The conventional design of such locking device 17 may be such that the steering wheel is mechanically locked in predetermined positions, provided the locking device 17 is released.

With the steering wheel released ($M_L=0$) and the vehicle at rest, a change of the motor angle $\delta_M$ causes mainly a turning of the steering wheel 11 or 21 with actuator input ($\delta_L'$=constant) to the wheels 15a and 15b, respectively, especially when at vehicle standstill the wheel reset moments $M_V$ are large. This is generally the case with normal road surface conditions. The steering wheel 11 or 21 can thus be moved to a known position by activation of the actuator motor 13 or 23, respectively, as the driver releases the steering wheel. The released steering lock then engages the steering wheel in this known position. The steering lock, or locking device, 17 can as well be released by the means described below for detection of a shut-down vehicle.

Figure 3:
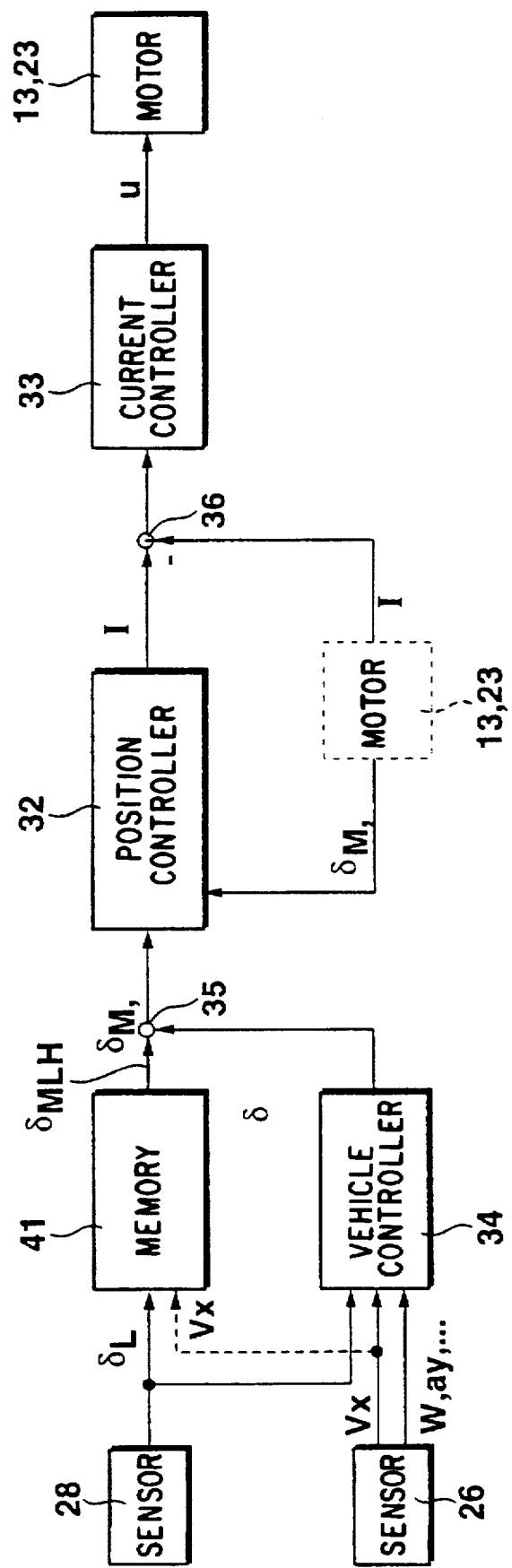
FIG. 3 shows the control.

FIG. 3 shows with the aid of a block diagram the operating mode of the steering system in normal operation, that is, in the travel operation of the vehicle. The steering wheel angle $\delta_L$ detected by the sensor 28 is transmitted to the power steering control 31. Depending on the steering wheel angle $\delta_L$ and, as the case may be, depending on the detected vehicle longitudinal velocity $V_x$, the power steering control 31 determines a set motor angle $\delta_{MLH}$. Also, depending on the vehicle movements detected by the sensors 26 (vehicle longitudinal velocity $V_x$, rate of yaw ω, transverse acceleration etc.), the vehicle controller 34 determines a corrective steering intervention $\delta_{korr}$. The set motor angle $\delta_{MLH}$ that allows for the power steering function, and the correction angle $\delta_{korr}$ that optimizes the dynamics of the vehicle are at point 35 superimposed to form a set motor angle $\delta_{M,soll}$, which is transmitted to the input of position controller 32. Also transmitted to the position controller 32 is the actual motor angle $\delta_{M,ist}$ of the motor 13 or 23. Depending on a set-actual comparison, the position controller 32 determines

4 in customary fashion the set motor current $I_{soll}$. Basing on the deviation of the set motor current $I_{soll}$ and the motor actual current $I_{ist}$ detected on the motor 13 or 23 (addition 36), the current controller 33 determines an appropriate activation signal u for the actuator 13 or 23 so as to realize the desired motor angle $\delta_{M,soll}$.

FIG. 4 now shows schematically the inventional extension of the control illustrated in FIG. 3. Shown to that end, in FIG. 4, is the previously described linkage 35 and the position controller 32 in the upper area. According to the present invention, a predetermined motor set angle $\delta_{M,soll}$ is now at point 48 transmitted as the vehicle is shut down and when started up for new travel. FIG. 4 illustrates for recognition of the vehicle shutdown or recognition of the new travel start a unit 43. Transmitted to the unit 43 are signals of the motor controller 44, of one or several vehicle door switches 45, of a vehicle lock 46 or of a take-off, or anti-theft lock 47. These signals are logically linked in the unit 43, whereafter the switches 49a and 49b are activated by the signals end and start.

Specific set values $\delta_{MA}$ and $\delta_{M,start}$ are stored in memories 41 and 42, which values can be passed to the position controller 32 by appropriate activation of the switch 49a and by closing the switch 49b. Stored in memory 41 is the motor angle $\delta_{MA}$ by which the actuator motor 13 or 23 is to be positioned in order to move the locking device 17 to the position for locking the steering wheel. Since several steering wheel positions may be provided for in which the locking device 17 can effect a locking of the steering wheel, the actual steering wheel angle position $\delta_{L,ist}$ is transmitted by the sensor 28 to the memory 41. Stored in memory 42, prior to the start of the inventional steering wheel positioning for locking, is the most recently selected steering wheel angular position $\delta_{M,start}$. To that end, the actual steering wheel angle $\delta_{L,ist}$ is transmitted to the memory 42 prior to the inventional positioning of the steering wheel to locking position. The switch 49a is then in the position shown in FIG. 4 when the signal start represents a shutdown of the vehicle. In this case, the switch 49b is closed by the signal end, whereafter the motor angle $\delta_{MA}$ is passed to the position controller 32.

When the means 43 now recognizes that the vehicle is to be started again, the switch 49a is moved to the position illustrated by the dashed line in FIG. 4, by the signal start, while the switch 49b remains closed. The motor set angle $\delta_{M,start}$ is thereby read out of the memory 42 and transmitted to the position controller 32. This ensures that the steering wheel position corresponds at travel start to the position in which the vehicle was shut down.

Moreover, the memory 42 can be controlled by the signal end to the effect that the actual steering wheel angle $\delta_{L,ist}$ is written to memory 42 whenever the vehicle is shut down. Furthermore, the signal end can be passed to the locking device 17 in order for the locking to actually be released as the corresponding steering wheel position is reached.

The inventional steering wheel positioning commences whenever the unit 43 determines that the ignition of the vehicle engine is turned off, the fuel metering of the vehicle engine is turned off, that one or several vehicle doors, notably the driver door, are opened and closed again, that the ignition is being removed and/or a take-off anti-theft lock is activated. The information of the units 44–47 can be logically linked easily in the sense of the above explanations, all of them jointly or in any combination.

In summary it is noted that the inventional procedure achieves an improved theft protection in that the steering lock engages always as the vehicle is shut down. The driver is freed of the task of engaging the steering lock. The proposed function can be realized without additional sensor expense. Specifically, the invention may be combined with a take-off lock.

We claim:

1. Steering system for a motor vehicle, comprising: a steering wheel actuated by the driver of the vehicle; a steered wheel; an actuator motor, said steering wheel and said actuator motor operatively connected to said steered wheel, said steered wheel having movement responsive to a movement of said steering wheel and a movement of said actuator motor; and a locking device for locking said steering wheel in a predetermined position, said predetermined position associated with a predetermined preset operating condition, said steering wheel being moved to said predetermined position by said actuator motor upon detection of said predetermined preset operating condition.

2. Steering system according to claim 1, further comprising an actuator having a plurality of inputs and an output, said steering wheel connected to one of said actuator inputs, said actuator motor connected to another of said actuator inputs, said actuator output operatively connected to said steered wheel, said actuator motor activated by a manipulated variable, whereby said actuator superimposes said steering movement and said actuator motor movement to generate said steered wheel movement.

3. Steering system according to claim 1, wherein said locking device comprises a mechanical lock for mechanically locking said steering wheel.

4. Steering system according to claim 1, further comprising recongnizing means for detecting said predetermined preset operating condition said recognizing means having a plurality of inputs and an output, each said input associated with an input signal indicative of one of the operating condition of the motor vehicle engine, the state of closure of the vehicle doors, the position of a vehicle lock and/or the operating condition of one of a take-off, and anti-theft lock, said detecting means output providing an output signal indicating the detection of said specific predetermined operating condition, said actuator motor activated in response to said output signal.

5. Steering system according to claim 4, wherein said detecting means provides said output signal indicating the detection of said predetermined preset operating condition when said plurality of input signals indicate a lack of ignition and/or injection signals the opening and closing of the driver door the removal of a key from the vehicle lock and/or the activation of one a take-off and anti-theft lock.

6. Steering system according to claim 1, wherein said steering wheel is associated with a further predetermined position, said further predetermined position responsive to a further predetermined preset operating condition, said steering wheel being moved to said further predetermined position by said actuator.

7. Steering system according to claim 6, wherein said further predetermined position comprises a position of said steering wheel upon detection of said predetermined preset operating condition.

8. Steering system according to claim 6, further comprising means for detecting said further predetermined preset operating condition, said further detecting means having a plurality of inputs and an output, each said input associated with an input signal indicative of one of the operating condition of the vehicle engine, the state of closure of the vehicle doors, the position of a vehicle lock and/or the operating condition of one of a take-off, and anti-theft lock, said further detecting means output providing a second output signal indicating the detection of said further predetermined preset operating condition, said to actuator activated in response to said second output signal.

9. Steering system according to claim 8, wherein said further detecting means provides said second output signal to indicate the detection of said further predetermined preset operating condition when said plurality of inputs signals associated with said plurality of further recognition inputs indicate the presence of one of an ignition and injection signals, the opening and closing again of the driver door, the insertion of a key into the vehicle lock and/or the deactivation of one of a take-off, and anti-theft lock.

10. A method for locking a steering wheel of a vehicle into a predetermined position upon the shutdown of a vehicle, comprising the steps of:

providing a steering system having a steering wheel, a steered wheel, an actuator, and a locking device operatively connected together;

detecting the occurrence of a predetermined preset operating condition;

moving the steering wheel to a predetermined position associated with the locking device after detecting the occurrence of the predetermined preset operating condition; and locking the steering wheel with the locking device.

11. The method according to claim 10, wherein said step of detecting the occurrence of a predetermined preset operating comprises the steps of:

detecting the operating condition of the motor;

detecting the closure status of the vehicle doors;

detecting the position of the door lock; and detecting the operating condition of one of a take-off and anti-theft lock.

12. The method according to claim 10 further comprising the steps of detecting the occurrence of a further predetermined preset operating condition, and moving the steering wheel to a further predetermined position upon the detection of the further predetermined preset operating condition.

13. The method according to claim 12, wherein said step of moving the steering wheel to a further predetermined position comprises moving the steering wheel to the position of the steering wheel at the time of detecting the predetermined preset operating condition.

14. The method according to claim 13, wherein said step of detecting the further predetermined preset operating condition comprises:

detecting the operating condition of the vehicle engine;

detecting the closure state of the vehicle doors;

detecting the position of the vehicle lock; and detecting the operating condition of one of a take-off and anti-theft lock.

* * * * *

UNITED STATES PATENT AND TRADEMARK OFFICE
CERTIFICATE OF CORRECTION

PATENT NO. : 5,893,429
DATED : April 13, 1999
INVENTOR(S) : Matthias Hackl, et. al.

It is certified that error appears in the above-indentified patent and that said Letters Patent is hereby corrected as shown below:

Claim 8, line 6, after "said" delete "to".

Signed and Sealed this

Sixteenth Day of November, 1999

Attest:

Q. TODD DICKINSON

Attesting Officer

Acting Commissioner of Patents and Trademarks